Feb. 6, 1951
H. W. KOST
2,540,790
MOLDING FASTENER
Filed Aug. 8, 1945
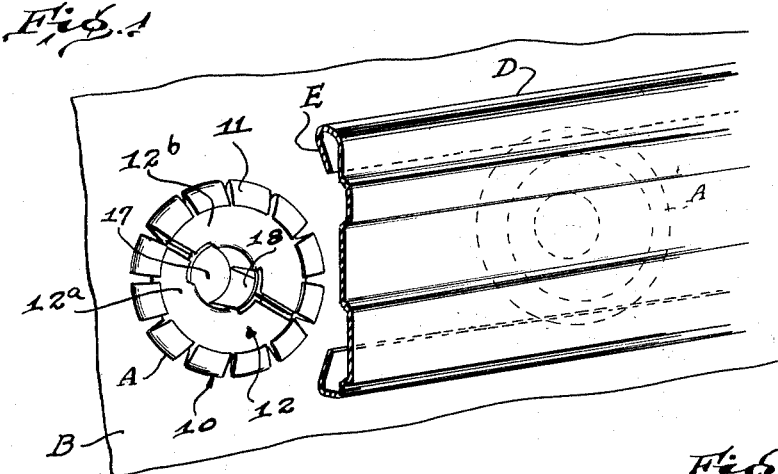
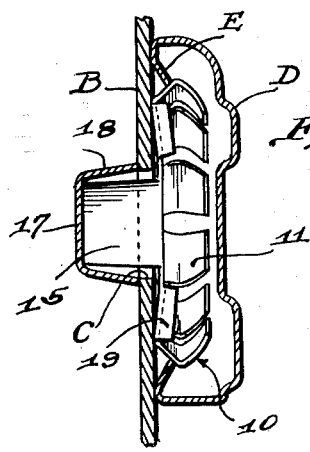
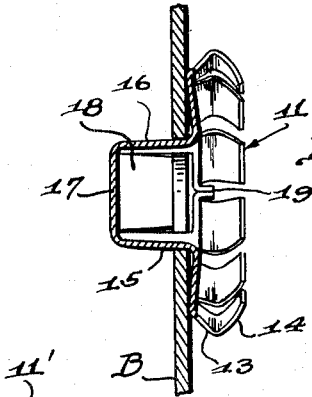
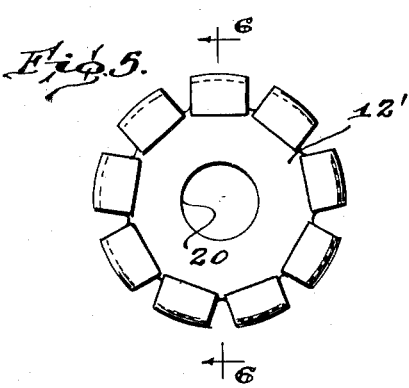
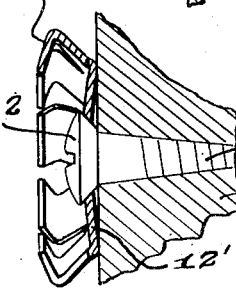
INVENTOR
Harold W Kost
By Malcolm W. Fraser
ATTORNEY Patented Feb. 6, 1951

2,540,790

UNITED STATES PATENT OFFICE 2,540,790

MOLDING FASTENER

Harold W. Kost, Toledo, Ohio, assignor, by mesne assignments, to Prestole Corporation, Toledo, Ohio, a corporation of Michigan Application August 8, 1945, Serial No. 609,595

1 Claim. (Cl. 24—213)

This invention relates to fasteners but more particularly to fasteners for attaching molding strips of the type having oppositely disposed inturned flanges to a supporting panel and an object is to produce a molding fastener or clip which may be readily mounted on the supporting panel and to which the molding strip can be applied by snap engagement and which has the new and improved features of construction and arrangement hereinafter described.

Other objects and advantages of the invention will hereinafter appear and for purposes of illustration but not of limitation, embodiments of the invention are shown in the accompanying drawings in which Figure 1 is a perspective view of a molding fastener applied to a supporting panel and showing a portion of the molding strip adapted to be applied or mounted upon the fastener;

Figure 2 is a longitudinal sectional view showing several molding clips or fasteners connected to a supporting panel with the molding strip applied thereto;

Figure 3 is an enlarged sectional view showing the molding clip mounted upon the supporting panel with the molding strip mounted thereon;

Figure 4 is a sectional view somewhat similar to Figure 3 but in a different plane and with the molding strip removed;

Figure 5 is a top plan view of another form of molding fastener which is connected to the supporting panel by means of a screw or similar fastener; and Figure 6 is a sectional view of the fastener shown in Figure 5 taken substantially on the line 6—6 thereof, but showing the supporting panel in section with the screw in place.

The illustrated embodiment of the invention shown in Figures 1 to 4 comprises a molding fastener A which is adapted to be mounted upon a supporting panel B, the latter having a hole C for reception of the snap engaging portion of the fastener, the fastener being adapted to support a molding strip D.

The molding strip D may be of any desired form but as shown, the strip is of metal and is formed with a pair of inturned oppositely disposed longitudinally elongate flanges E. The flanges E of the molding strip are engaged by the head 10 of the fastener A. The head 10 as shown, is circular in form somewhat resembling a rosette and is made up of a plurality of spring fingers 11 which are arranged in an annular row in spaced relation to each other.

The fingers 11 are integral with a base 12 which consists of parts 12a and 12b of semi-circular formation. The fingers 11 incline outwardly and upwardly as indicated at 13 and thence extend upwardly and inwardly as indicated at 14, the two angular extending portions being substantially of equal length. It will be understood that the molding strip is readily applied to the fastener head A by merely snapping the flanges E over the spring fingers 11 so that the free edge portions of the flanges are disposed between the supporting panel B and the finger portions 13, the molding flanges inclining upwardly to abut against these surfaces and in view of the resiliency of the fingers 11, the molding strip is firmly urged into intimate engagement with the adjacent surface of the supporting panel B.

It will be observed that the base 12 and particularly the parts or sections thereof, are cambered so that the central portion thereof extends upwardly with respect to the outer edge portions. Integrally formed with the central portion of each of the base parts 12a and 12b are arms 15 and 16 which are joined by an integral inner wall 17. The arms 15 and 16 and the wall 17 provide a cup-like structure and the arms 15 and 16 are curvilinear in cross section to conform to the angular opening C formed in the supporting panel B. Integral with the bottom wall 17 of the cup formation and disposed between the arms 15 and 16 are rectilinearly shaped spring tongues 18 which normally incline outwardly. The spring tongues 18 have their free ends spaced from the base 12 sufficiently so that when the cup is forced into the hole of the supporting panel a predetermined distance, the fingers 18 snap outwardly to engage the under surface of the supporting panel substantially as shown in Figure 3. In so doing, the base is flattened out slightly in order that the fastener will securely remain in place under spring tension. The tongues 18 are also curvilinear in cross section to facilitate their passage through the opening in the supporting panel.

It will be observed that in the stamping operation in forming the fastener, the adjacent edges of the base sections 12a and 12b are bent upwardly at 19 and these flanges are held in engagement with each other by the engagement of the arms 15 and 16 with the adjacent edge portions of the panel aperture.

From the above description, it will be manifest that the fastener can be readily and conveniently mounted on a supporting panel by a simple snap engagement and that regardless of the position of the head A of the fastener, the molding strip can be applied particularly in view of the number and arrangement of the spring fingers 11. By arranging the fingers outwardly of the edge of the base of the fastener which is cambered and held under spring tension, sufficient resiliency is afforded to the fingers and still the flanges of the molding strip are firmly held in intimate engagement with the adjacent surface of the supporting panel.

The fastener is adapted to be manufactured from a single strip of spring metal so that it can be accommodated to large scale production in an efficient manner.

The form shown in Figures 5 and 6 is similar to that above described but in this instance, the base 12 is in the form of an upwardly cambered disc formed with a central aperture 20 to receive a screw 21, the head 22 of which is adapted to hold the fastener securely to the support B'. The fingers 11' are similar to the fingers 11 above described and are integral with the edge portion of the base 12'.

It is to be understood that numerous changes in details of construction, arrangement and operation may be effected without departing from the spirit of the invention especially as defined in the appended claim.

What I claim is:

A one-piece spring-metal molding fastener comprising a substantially annular base having a lower side adapted to engage against a supporting panel, an upper side, a central aperture, and an outer peripheral edge portion, a plurality of resilient tongues inclining upwardly and outwardly from said outer peripheral edge portion and thence inwardly and upwardly, the spring-metal forming said base being dished upwardly from said outer peripheral edge portion to said central aperture whereby, upon initial engagement of said base against said supporting panel, said peripheral edge portion only contacts said panel and whereby, upon tightening down of a headed fastener element having a shank engaging through said central aperture into said supporting panel, to tension said spring-metal.

HAROLD W. KOST.

REFERENCES CITED

The following references are of record in the file of this patent:

UNITED STATES PATENTS

| Number | Name | Date |
|---|---|---|
| 717,246 | Murphy | Dec. 30, 1902 |
| 1,850,713 | Fox | Mar. 22, 1932 |
| 2,118,800 | Smith | May 24, 1938 |
| 2,238,238 | Westrope | Apr. 15, 1941 |
| 2,315,211 | Kost | Mar. 30, 1943 |